United States Patent Office 3,026,297
Patented Mar. 20, 1962

3,026,297
OXIDIZABLE DIENE RUBBER CONTAINING PHENOLIC SUBSTITUTED XYLENES
Ronald B. Spacht, Kent, Ohio, assignor to The Goodyear Tire & Rubber Company, Akron, Ohio, a corporation of Ohio
No Drawing. Filed Nov. 12, 1958, Ser. No. 773,168
9 Claims. (Cl. 260—45.95)

This invention relates to a new class of age resistors for organic compositions subject to deterioration due to oxidation and other influences, particularly rubber.

Rubber, for example, is subject to deterioration from many sources such as sunlight, ozone, atmospheric oxygen, presence of heavy metals, etc. Both cured and uncured natural and synthetic elastomers are subject to deterioration. Deterioration in cured stock may likewise vary with the type of stock, the state of cure, the amount of surface exposed and the temperature at which the rubber is being used. An ideal antioxidant is one which would protect rubber from deterioration of any kind, in the cured or uncured state and no matter where used. Since no such antioxidant has been discovered, compromises must be made in the selection of an antioxidant for use in rubber.

Certain phenolic compositions have been found to be effective antioxidants. While many of these phenolic compositions display antioxidant activity, there is a very great difference between various types of phenolic materials in their effectiveness as age resistors. The effectiveness of a phenolic antioxidant will vary considerably with the type of groups present, the location of the hydroxyl radicals and the location of the substituent groups. Furthermore, the vapor pressure of the molecule is of importance for certain uses, i.e. for high temperature uses and for uses wherein large surfaces are exposed. Again, compromises may have to be made. A good antioxidant may be too volatile for general usage while on the other hand a nonvolatile material may be a poor antioxidant.

According to the present invention, a class of compositions has been discovered which exhibit unusual and unexpected antioxidant activity and which are relatively nonvolatile. They exhibit a high degree of protection for organic hydrocarbon compositions against sunchecking and against atmospheric oxygen. They are derived from cheap raw materials and hence possess an economic advantage over most antioxidants of this general class.

In the practice of this invention, it has been discovered that certain resinous phenolic-substituted xylylene compositions display new and unexpected antioxidant activity. In particular, substituted xylylene compositions having two phenolic substituents wherein the phenolic substituents may be monohydroxy benzenes or substituted monohydroxy benzenes are very desirable antioxidants. The preferred compositions are substituted xylylenes having two phenolic substituents, the phenolic substituents being selected from the group consisting of phenol and substituted phenols having at least one ring position substituted with at least one radical selected from the group consisting of alkyl radicals, tertiary alkyl radicals and aralkyl radicals. Superior products are those substituted xylylenes having two phenolic substituents, the phenolic substituents having from 0 to 3 ring positions substituted with at least one radical selected from the group consisting of an alkyl radical having from 1 to 5 carbon atoms, a tertiary alkyl radical having from 4 to 9 carbon atoms and an aralkyl radical.

The products can further be identified with reference to the following structural formula:

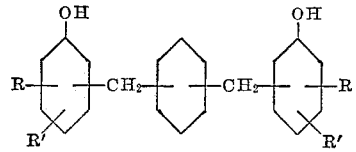

wherein R and R' are selected from the group consisting of hydrogen, alkyl radicals having from 1 to 5 carbon atoms, tertiary alkyl radicals having from 4 to 9 carbon atoms and aralkyl radicals.

The products of this invention can be prepared by reacting alpha, alpha'-dihalo(chloro, bromo or iodo) xylenes with phenol or substituted phenols. Any of the alpha, alpha'-dihaloxylenes (ortho, meta or para) can be used in the practice of this invention, although the ortho and para compounds are preferred. Because of the obvious economic advantage, mixtures are customarily used wherein ortho and para xylenes comprise the major proportion of the mixture. Also, the reactions can be completed in one operation.

The preferred reaction can be illustrated with the following structural equation:

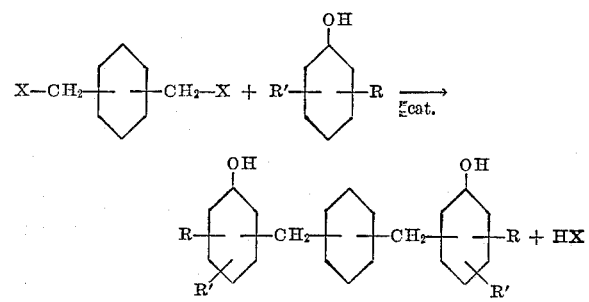

wherein X is a halogen and R and R' are selected from the group consisting of hydrogen, alkyl radicals having from 1 to 5 carbon atoms, tertiary alkyl radicals having from 4 to 9 carbon atoms and aralkyl radicals.

The phenolic composition may be any aromatic compound which contains at least one hydroxyl group directly attached to the aromatic nucleus. Representative examples are phenol, the cresols, the xylenols, the ethyl phenols, the propyl phenols, the chlorophenols, the nitrophenols, the thymols, the carvacrols, monoalphaphenylethyl phenol, dialphaphenylethyl phenol, octyl phenol, tertiary butyl phenol and the multiple ring compounds such as the naphthols and diphenyl phenols. Also, dihydric phenols such as catechol, resorcinol and hydroquinone are included. Polyhydric phenols such as phloroglucinol and pyrogallol are within the scope of the invention.

Although this invention has been described with particular reference to pure phenolic compounds, mixtures of the various phenolic materials are within the scope of the invention. For example, the product to be protected may be treated with one or more than one of the pure resinous polymerization products or it may be treated with the resinous polymerization products of a mixture of xylylene phenols.

Preferably, the phenolic reactant will be phenol or a substituted phenol having from none of the ring positions to three thereof substituted with at least one radical selected from the group consisting of an alkyl radical having from 1 to 5 carbon atoms, a tertiary alkyl radical having from 4 to 9 carbon atoms and an aralkyl radical.

In the practice of the invention, the alpha, alpha'-dihaloxylenes may be reacted with simple phenolic compositions and the products of this reaction thereafter treated with various alkylating agents. For example, the simple phenols may be further treated with a tertiary composition selected from the group consisting of isobutylene, tertiary pentenes, tertiary octenes or tertiary nonenes. If the phenolic rings are to contain more than one tertiary substituent, it is preferable to treat the reaction product first with a composition selected from tertiary octenes and tertiary nonenes and thereafter treating the products with a tertiary olefin selected from tertiary butenes and tertiary pentenes. Of course, mixtures of these compositions may be used. Also, the simple phenols may contain aralkyl substituents. These aralkyl substitutents may be provided by reacting the phenols with a composition selected from the group consisting of styrene, vinyl toluene and alhpamethyl styrene which will in turn provide alphaphenylethyl radicals, alphatolylethyl radicals, or alphamethyl-alphaphenylethyl radicals.

Although it is preferred to react the alpha, alpha'-dihaloxylenes with the simple phenols, e.g. phenol or those phenols having alkyl radicals containing from 1 to 5 carbon atoms, and then with a tertiary alkyl composition and/or an aralkyl composition the reverse procedure may be employed in which the phenolic reactant is alkylated prior to reaction with the alpha, alpha'-dihaloxylenes and similar products will result. When the latter process is employed, the molar proportion of tertiary olefin to phenol should be kept not over 2 to 1 so that at least one and preferably two positions ortho and/or para to the hydroxyl are available to react with the xylenes.

In the practice of the invention metallic iron and related metals or one or more of the customary acidic alkylation catalysts is used to activate and accelerate the reactions. For example, alkane sulfonic acids, sulfuric acid, benzene sulfonic acid, toluene sulfonic acid, activated clay, stannic chloride, ferrous chloride, boron trifluoride, zinc chloride, the ferrous and ferric halides, the stannous and stannic halides, aluminum halide and aluminum oxide may be employed to activate the reactions. Usually metallic iron or zinc chloride is used as the reaction catalyst. The catalyst will ordinarily be used in an amount of at least 0.5% of the total weight of reactants in order to insure an adequate rate of reaction, and larger amounts of catalyst from 0.5% up to 5.0% by weight of the reactants may be employed.

Although the conditions of reaction will vary a great deal, depending on the compositions being reacted and other factors such as pressure, the temperature will ordinarily be maintained within a range of 50 to 200° C. during the process. Although the reaction will take place at temperatures below 50° C., perhaps down to normal room temperature, if the temperature is much below 50° C. reaction proceeds rather slowly and if the temperature rises to much above 200° C. the customary alkylation catalysts may reverse their roll and become catalyst for de-alkylation.

The preparation of the products of this invention can further be illustrated by the following examples which are not intended as limitations:

EXAMPLE 1

Two hundred and eight grams of paracresol and 58 grams of alpha, alpha'-dichloro-para-xylene were mixed together and slowly heated in the presence of 1 gram of iron filings. HCl began to come off at 90° C. After two hours of reaction, 90% of the theoretical yield of HCl had been liberated and the temperature had risen at 200° C. The reaction product was heated to 203° C. at 9 millimeters of pressure to remove the excess paracresol and other volatile materials. The yield from this reaction was 88% of resinous reaction product.

EXAMPLE 2

One hundred and eight grams of orthocresol and 66 grams of alpha, alpha'-dichloro mixed ortho and para-xylene were heated together in the presence of 1 gram of zinc chloride. This reaction proceeded very rapidly. When all of the HCl had been liberated, the reaction product was heated to 200° C. at 20 millimeters of pressure to remove the volatile materials. This gave 107 grams of resinous reaction product.

EXAMPLE 3

Sixty-one grams of 3,4-xylenol, 44 grams of alpha, alpha'-dichloro-p-xylene and 1 gram of $ZnCl_2$ were dissolved in 100 milliliters of $C_6H_6$. The mixture was heated under reflux for 1½ hours at which time the evolution of HCl was complete. The mixture was heated to 175° C. at 20 millimeters to remove volatile and unreacted materials. A residue of 75.5 grams was obtained.

EXAMPLE 4

Sixty-one grams of 2,4-xylenol, 44 grams of alpha, alpha'-dichloro-p-xylene, 1 gram of $ZnCl_2$ and 100 milliliters of $C_6H_6$ were heated under reflux for 1½ hours at which time all of the HCl had been liberated. The reaction mixture was heated to 175° C. at 20 millimeters to remove volatile and unreacted material. A quantitative yield of product remained.

EXAMPLE 5

One hundred and sixty-four grams of mono-tertiary butyl-p-cresol, 44 grams of alpha, alpha'-dichloro-p-xylene and 1 gram of $ZnCl_2$ were heated to 90° C. for 2½ hours at time no more HCl was evolved. The reaction mixture was heated under vacuo to remove volatiles. A 90% yield of expected product was obtained.

EXAMPLE 6

Two hundred grams of o-alpha-phenylethyl phenol, 58 grams of alpha, alpha'-dichloro-o, p-xylene and 1 gram of $ZnCl_2$ were heated at 75° C. for one hour after which no further HCl was obtained. The reaction mixture was heated to a temperature of 200° C. at 0.5 millimeters to remove unreacted materials.

EXAMPLE 7

One hundred and eight grams of mixed cresols, 88 grams of alpha, alpha'-dichloro mixed xylenes, 2.0 grams of $ZnCl_2$ and $C_6H_6$ were heated at 50° C. until all the HCl was liberated. This required between 1½ and 2 hours. The unreacted materials were removed by heating to 185° C. at 30 millimeters.

The efficacy of this invention has been further demonstrated by testing the antioxidant properties in a standard rubber formulation comprised as follows:

| | |
|---|---|
| Extracted pale crepe | 100.0 |
| ZnO | 5.0 |
| Sulfur | 3.0 |
| Hexamethylene tetramine | 1.0 |
| Stearic acid | 1.5 |
| Antioxidant | 1.0 |

As shown in the following table, antioxidant efficiency is measured by aging samples of rubber containing the antioxidants for 18 days in an oxygen bomb at 50° C. and under 150 pounds pressure. Tensile retention and weight increase are used as measures of efficiency of the antioxidants.

*Table I*

[Cure—50 minutes at 285° F.]

| | Percent Tensile Retention | Percent Weight Increase |
|---|---|---|
| Control—No antioxidant | 0 | 14.49 |
| Antioxidant A[1] | 27.1 | 1.15 |
| R.P.α,α′-dichloro-p-xylene and p-cresol | 75.4 | 0.29 |
| R.P.α,α′-dichloro-o and p-xylene and p-cresol | 71.9 | 0.27 |
| R.P.α,α′-dichloro-o and p-xylene and o-cresol | 67.0 | 0.28 |
| R.P.α,α′-dichloro-o and p-xylene and o-alphaphenylethyl phenol | 59.8 | 0.72 |
| R.P.α,α′-dichloro-xylene and 3,4-xylenol | 90.8 | 0.64 |
| R.P.α,α′-dichloro-xylene and 2,4-xylenol | 73.8 | 0.56 |
| R.P.α,α′-dichloro-xylene and mono-tertiary butyl-p-cresol | 81.9 | 0.15 |
| R.P.α,α′-dichloro-xylene and mixed cresols | 81.1 | 0.57 |
| R.P.α,α′-dichloro-xylene and 2,5-xylenol | 88.9 | 0.44 |

[1] Antioxidant A is a commercial mixture of alkylated phenols. R.P. means reaction product.

Reference to the above table thus illustrates that the preferred products of this invention display new and unexpected antioxidant activity, all of the products tested being far superior to an accepted commercial antioxidant.

The products of this invention are useful as age resistors or antioxidants in all of the organic hydrocarbon compositions which are similar from the standpoint of aging. For example, the products of this invention are useful as age resistors in both vulcanized and raw rubber, either natural or synthetic, and in oils, gasolines, fats, and other unsaturated organic compounds.

The rubbers which can be protected by the products of this invention are oxidizable, rubbery polymers of conjugated dienes which include natural rubber and the various synthetic diene rubbers which are similar to natural rubber in their aging characteristics, such as polychloroprene; butyl rubber which is a polymerization product of a major proportion of a mono olefin, such as isobutylene, and a minor proportion of a multi-olefin, such as butadiene or isoprene; the rubbery copolymers of butadiene and styrene which may contain from 50 to 75% by weight of butadiene; the rubbery copolymers of butadiene and acrylonitrile; and polyisoprene.

The products of the invention are useful as age resistors for raw rubber in latex form, coagulated rubber latices or vulcanized rubber and may be present in an amount of from .25 to 5% by weight, based on the weight of rubber, although it is generally preferred to use from 0.5 to 2% by weight, based on the weight of the rubber.

The antioxidants of this invention can be incorporated into rubber in any customary manner. They may be added in the form of physical mixtures or in the form of emulsions, using any of the known emulsifiers such as monovalent metal hydroxides, fatty acids, organic soaps, etc. They may be added to the rubber in the form of latex, or they may be milled into coagulated rubber in the usual manner.

The compounds of this invention can be used to stabilize thermally and catalytically cracked gasolines and gasoline blends by adding about .0001% to 0.1% by weight of the antioxidant to the gasoline.

This is a continuation-in-part of application Serial No. 550,775, filed December 2, 1955, now abandoned.

While certain representative embodiments and details have been shown for the purpose of illustrating the invention, it will be apparent to those skilled in this art that various changes and modifications may be made therein without departing from the spirit or scope of the invention.

I claim:

1. An oxidizable diene rubber containing as an antioxidant in an antioxidant amount a substance conforming to the following structural formula

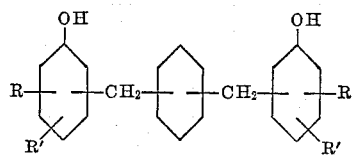

wherein R and R′ are selected from the group consisting of hydrogen, alkyl radicals having from 1 to 3 carbon atoms, tertiary alkyl radicals having from 4 to 9 carbon atoms and aralkyl radicals.

2. An oxidizable diene rubber containing as an antioxidant in an antioxidant amount a substance conforming to the following structural formula

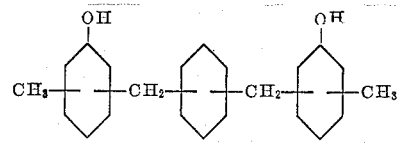

3. An oxidizable diene rubber containing an an antioxidant in an antioxidant amount a substance conforming to the following structural formula

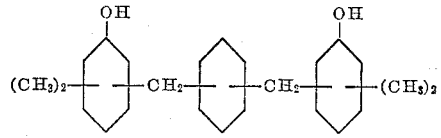

4. An oxidizable diene rubber containing as an antioxidant in an antioxidant amount a substance conforming to the following structural formula

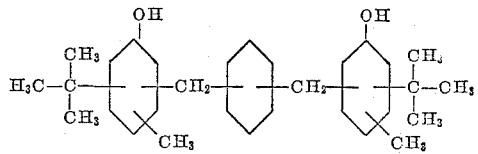

5. An oxidizable diene rubber containing as an antioxidant in an antioxidant amount a substance conforming to the following structural formula

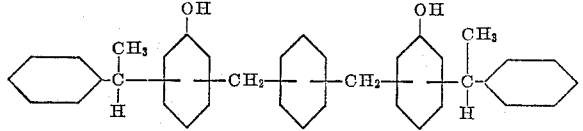

6. An oxidizable diene rubber containing as an antioxidant in an antioxidant amount a substance conforming to the following structural formula

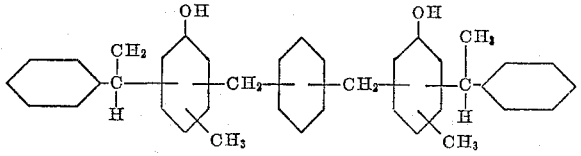

7. An oxidizable diene rubber containing from 0.25 to 5.0% by weight based on the weight of the rubber of a substance conforming to the following structural formula

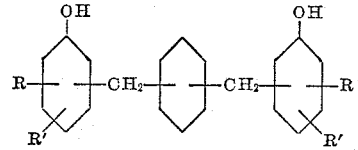

wherein R and R′ are selected from the group consisting of hydrogen, alkyl radicals having from 1 to 3 carbon atoms, tertiary alkyl radicals having from 4 to 9 carbon atoms and aralkyl radicals.

8. An oxidizable diene rubber containing from 0.25 to 5.0% by weight based on the weight of the rubber of a substance conforming to the following structural formula

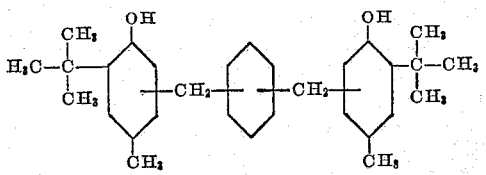

9. An oxidizable diene rubber containing from 0.25 to 5.0% by weight based on the weight of the rubber of the reaction product of alpha, alpha'-dihaloxylenes and a phenol conforming to the following general structure

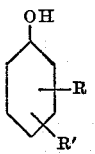

wherein R and R' are selected from the group consisting of hydrogen, alkyl radicals having from 1 to 3 carbon atoms, tertiary alkyl radicals having from 4 to 9 carbon atoms and aralkyl radicals, the reactants being reacted in the proportion of at least 2 mols of the phenol to 1 mol of the alpha, alpha'-dihaloxylene at a temperature between 50° C. and 200° C.

References Cited in the file of this patent

UNITED STATES PATENTS

| | | |
|---|---|---|
| 2,321,627 | Rothrock | June 15, 1943 |
| 2,841,627 | Beaver et al. | July 1, 1958 |